United States Patent [19]

Becker et al.

US005773648A

[11] Patent Number: 5,773,648
[45] Date of Patent: Jun. 30, 1998

[54] PREPARATION OF POLYTETRAHYDROFURAN

[75] Inventors: Rainer Becker, Bad Dürkheim; Christoph Sigwart, Schriesheim; Michael Hesse, Schifferstadt; Rolf Fischer, Heidelberg; Karsten Eller, Ludwigshafen; Gerd Heilen, Neustadt; Klaus-Dieter Plitzko, Limburgerhof, all of Germany

[73] Assignee: BASF Aktiengesellschaft, Ludwigshafen, Germany

[21] Appl. No.: 793,987

[22] PCT Filed: Sep. 21, 1995

[86] PCT No.: PCT/EP95/03651

§ 371 Date: Mar. 10, 1997

§ 102(e) Date: Mar. 10, 1997

[87] PCT Pub. No.: WO96/09335

PCT Pub. Date: Mar. 28, 1996

[30] Foreign Application Priority Data

Sep. 21, 1994 [DE] Germany .................. 44 33 606.3

[51] Int. Cl.⁶ .................. C07C 67/24; C07C 43/18
[52] U.S. Cl. .................. 560/240; 560/103; 568/606; 568/617
[58] Field of Search ................ 560/240, 103; 568/617, 606

[56] References Cited

U.S. PATENT DOCUMENTS

| | | | |
|---|---|---|---|
| 2,499,725 | 3/1950 | Copelin | 560/240 |
| 3,358,042 | 12/1967 | Dunlop et al. | 568/617 |
| 3,856,826 | 12/1974 | Bruce | 549/533 |
| 4,120,903 | 10/1978 | Pruckmayr et al. | 568/617 |
| 4,230,892 | 10/1980 | Pruckmayr | 568/617 |
| 4,291,101 | 9/1981 | Tanizaki et al. | 428/514 |
| 4,303,782 | 12/1981 | McHale et al. | 528/416 |
| 4,482,411 | 11/1984 | Stephens | 149/19.4 |
| 4,568,775 | 2/1986 | Aoshima et al. | 568/617 |
| 4,658,065 | 4/1987 | Aoshima et al. | 564/487 |
| 5,102,849 | 4/1992 | Kemp et al. | 502/214 |
| 5,149,862 | 9/1992 | Dorai et al. | 560/240 |
| 5,210,283 | 5/1993 | Kahn et al. | 560/240 |
| 5,344,964 | 9/1994 | Chu et al. | 560/240 |
| 5,416,240 | 5/1995 | Weyer et al. | 568/617 |
| 5,641,857 | 6/1997 | Dostalek et al. | 528/361 |

FOREIGN PATENT DOCUMENTS

| | | |
|---|---|---|
| 286 454 | 10/1988 | European Pat. Off. . |
| 503 394 | 9/1992 | European Pat. Off. . |
| 29 32 216 | 2/1980 | Germany . |
| H1-288339 | 11/1989 | Japan . |
| H5 293375 | 11/1993 | Japan . |
| H4 241927 | 4/1994 | Japan . |

OTHER PUBLICATIONS

Chem Abstr. J5 8083–028, May 1983.
Chem Abstr. J6 2138–452 Jun., 1987.
Chem Abstr. J6 3303–190, Dec. 1988.
J. Chem. soc. Chem. Commun. 1987, 1259–1260.
Rare Metals, vol. 11, No. 3, Complex Solid Superacid . . . Yinyan et al., Jul. 1992.
Agnew. Chem. 72, 927 (1960).

*Primary Examiner*—Gary Geist
*Assistant Examiner*—Rosalynd Keys
*Attorney, Agent, or Firm*—Keil & Weinkauf

[57] ABSTRACT

A process for the preparation of polytetrahydrofuran or polytetrahydrofuran monoesters of $C_1$–$C_{10}$ monocarboxylic acids by the polymerization of tetrahydrofuran over a heterogeneous catalyst in the presence of one of the telogens water, 1,4-butanediol or polytetrahydrofuran having a molecular weight of from 200 to 700 dalton or a $C_1$–$C_{10}$ monocarboxylic acid or mixtures of these telogens, wherein a supported catalyst is used as catalyst, which contains a catalytically active amount of an oxygen-containing tungsten or molybdenum compound or mixtures of these compounds on an oxidic support material and which was calcined at temperatures ranging from 500° to 1000° C. following the application of the precursor compounds of said oxygen-containing molybdenum and/or tungsten compounds to the support material precursor.

10 Claims, No Drawings

PREPARATION OF POLYTETRAHYDROFURAN

This is a national stage application of PCT international application PCT/EP 95/03651 filed Sep. 21, 1995, published as WO96/09335 Mar. 28, 1996.

The present invention relates to a process for the preparation of polytetrahydrofuran or polytetrahydrofuran monoesters of $C_1$–$C_{10}$ monocarboxylic acids by the polymerization of tetrahydrofuran over a heterogeneous catalyst in the presence of one of the telogens water, 1,4-butanediol or polytetrahydrofuran having a molecular weight of from 200 to 700 dalton, of a $C_1$–$C_{20}$ monocarboxylic acid or of a carboxylic anhydride derived from $C_2$–$C_{20}$ monocarboxylic acids, or mixtures of these telogens.

Polytetrahydrofuran (PTHF), also called poly (oxybutylene glycol), serves as intermediate for the preparation of polyurethane, polyester and polyamide elastomers, for the preparation of which it is employed as diol component. The inclusion of PTHF in these polymers causes the latter to become soft and flexible, for which reason PTHF is also referred to as a soft segment component for these polymers. Polytetrahydrofuran monoesters of monocarboxylic acids are used, for example, as plasticizers (U.S. Pat. No. 4,482,411), impregnating agents (DE-A 2,932,216), monomers (EP-A 286,454), emulsifiers, and dispersing aids (JP-A 138452/1987) and are further employed for de-inking in the regeneration of waste paper (JP-A 303190/1988).

The cationic polymerization of tetrahydrofuran (THF) with the aid of catalysts has been described by Meerwein et al (Angew. Chem. 72, 927 (1960)). Either preformed catalysts are used as catalysts during this process, or the catalysts are produced in situ in the reaction mixture. This takes place by producing oxonium ions in the reaction medium with the aid of strong Lewis acids such as boron trichloride, aluminum chloride, tin tetrachloride, antimony pentachloride iron (III) chloride, or phosphorus pentafluoride or by means of strong Broensted acids, such as perchloric acid, tetrafluoroboric acid, fluorosulfonic acid, chlorosulfonic acid, hexachlorostannic acid, iodic acid, hexachloroantimonic acid, or tetrachloroferric acid and with the aid of reactive compounds designated as promotors, such as alkylene oxides, eg, ethylene oxide, propylene oxide, epichlorohydrin, or butylene oxide, oxetanes, orthoesters, acetals, α-halo ethers, benzyl halides, triarylmethyl halides, acid chlorides, β-lactones, carboxylic anhydrides, thionyl chloride, phosphorus oxychloride, or sulfonic halides, which oxonium ions initiate the polymerization of the THF. Of the large number of these catalyst systems few only have attained commercial significance however, since they are in some cases highly corrosive and/or in the preparation of PTHF lead to discolored PTHF products having only restricted usefulness.

Moreover many of these catalyst systems do not operate in a truly catalytical manner, but must be employed in stoichiometric amounts, based on the macromolecule to be prepared, and are consumed during the polymerization. For example, in the preparation of PTHF using fluorosulfonic acid as catalyst according to U.S. Pat. No. 3,358,042, two molecules of fluorosulfonic acid must be used as catalyst per molecule of PTHF. A particular drawback of the use of halogen-containing catalysts is that these lead to the formation of halogenated by-products during the preparation of PTHF, which are very difficult to separate from pure PTHF and have a detrimental influence on its properties.

In the preparation of PTHF in the presence of the promoters cited these promoters are incorporated as telogens in the PTHF molecule so that the primary product of the THF polymerisation is not PTHF but a PTHF derivative, for example, a PTHF diester or sulfonate, from which the PTHF must be freed in a further reaction, eg, by saponification or transesterification (of U.S. Pat. No. 2,499,725 and DE-A 2,760,272). When using alkylene oxides as promoters these also act as comonomers and are incorporated in the polymer with the result that THF alkylene oxide copolymers are formed having properties which differ from those of PTHF, particularly as regards the technological properties.

As described in U.S. Pat. No. 5,149,862 sulfate-doped zirconium dioxide can be used as an acidic, heterogeneous polymerization catalyst which is insoluble in the reaction medium. In order to accelerate the polymerization a mixture of acetic acid and acetic anhydride is added to the reaction medium, since the polymerization runs only very slowly in the absence of these promoters and a yield of only 6% is achieved over of a period of 19 h. In this process PTHF diacetates are formed which must then be converted by saponification or transesterification to PTHF.

U.S. Pat. No. 5,344,964 teaches the production of PTHF diesters by reaction of THF with a mixture of a monocarboxylic acid and a carboxylic acid anhydride. The reaction takes place in contact with metal oxides of metals of Groups III and IV of the Periodic Table of the Elements.

PTHF diesters are formed likewise during the polymerization of THF using fuller's earth catalysts according to EP-A 3,112.

In U.S. Pat. No. 4,303,782 zeolites are employed for the preparation of PTHF. The THF polymers obtained in this process have extremely high average molecular weights—$\overline{M}_n$ from 250.000 to 500.000 dalton and could not be generally adopted for the aforementioned purposes. Accordingly this process has also not attained industrial significance. A further serious drawback of this process is the small space-time yield (ca 4% of PTHF in 24 h) which is achieved with the zeolites used therein.

According to U.S. Pat. No. 4,120,903 PTHF can be prepared from THF and water with the aid of super-acidic Nafion® ion exchanger resins. These special ion exchangers are difficult to manufacture and thus very expensive and cause an increase in the cost of the PTHF prepared with their assistance. A further drawback of these ion exchanger resins is their inadequate long-term stability and their lack of ability to be reactivated, which also has a negative influence on the economy of the process.

JP-A 83028/1983 teaches the polymerization of THF in the presence of a carboxylic halide or carboxylic anhydride, a hetero polyacid being used as catalyst. PTHF diesters are again formed during this process, and these must be hydrolyzed to PTHF.

JP-A 911 71/94 relates to a catalyst consisting of an oxidic support material which contains a salt of a hetero polyacid and which has been prepared by application of the heteropoly acid salt to the support material and drying at a temperature of 300° C. At this drying temperature the chemical structure of the hetero polyacid remains unchanged. The use of these catalysts for the polymerization of tetrahydrofuran is proposed. These catalysts have however the drawback of a brief useful life since the hetero polyacid adsorbed on the support bleeds during execution of the process.

In U.S. Pat. No. 4,568,775 and U.S. Pat. No. 4,658,065 there is described a process for the preparation of PTHF in which hetero polyacids are employed as catalysts. The hetero polyacids are soluble to a certain extent in the polymerization mixture and in the polymer and must be removed therefrom, since they cause discoloration of the PTHF product, by the use of elaborate measures, viz the addition of a hydrocarbon in order to precipitate the hetero polyacid, the separation of the precipitated hetero polyacid and the separation of the added hydrocarbon. EP-A 503,394 relates to a process for the preparation of monoesters of monocarboxylic acids by means of heteropoly acid catalysts.

All of the aforementioned processes for the preparation of PTHF or PTHF diesters have the drawback of producing low or moderate space-time yields. It is thus the object of the present invention to provide a process which makes is possible to obtain PTHF and PTHF monoesters in high space-time yields, ie with high selectivity at a high THF yield.

Accordingly we have found a process for the preparation of polytetrahydrofuran or polytetrahydrofuran monoesters of $c_1$–$c_{10}$ mono-carboxylic acids by the polymerization of tetrahydrofuran over a heterogeneous catalyst in the presence of one of the telogens water, 1,4-butanediol or polytetrahydrofuran of a molecular weight of from 200 to 700 dalton, or of a $C_1$–$C_{10}$ monocarboxylic acid or mixtures of these telogens, wherein a supported catalyst is used as catalyst which contains a catalytically active amount of an oxygen-containing tungsten or molybdenum compound or a mixture of these compounds on an oxidic support material and which has been calcined at temperatures ranging from 500° to 1000° C. following the application of the precursor compounds of the oxygen-containing molybdenum and/or tungsten compounds to the support material precursor.

The polymerization catalysts used in the process according to the invention are supported catalysts consisting of an oxidic support material, which contain oxygen-containing molybdenum or tungsten compounds or mixtures of such compounds as catalytically active compounds and which furthermore, if desired, can be additionally doped with sulfate or phosphate groups. In order to convert them to their catalytically active form the supported catalysts are subjected, following the application of the precursor compounds of the catalytically active, oxygen-containing molybdenum and/or tungsten compounds to the support material, to calcination at a temperature of from 500° to 1000° C., the support material and the precursor compound experiencing conversion to the catalysts which can be used in the process of the invention.

Examples of suitable oxidic supports are zirconium dioxide, titanium dioxide, hafnium oxide, yttrium oxide, lron(III) oxide, aluminum oxide, tin(IV) oxide, silicon dioxide, zinc oxide, or mixtures of these oxides. Zirconium dioxide and/or titanium dioxide are particularly preferred.

The catalysts which can be used in the process of the invention contain in general from 0.1 to 50 wt % and preferably from 1 to 30 wt % and more preferably from 5 to 20 wt % of the catalytically active, oxygen-containing compounds of molybdenum or tungsten or the mixtures of the catalytically active, oxygen-containing compounds of these metals, in each case based on the total weight of the catalyst, and in each case calculated as $MoO_3$ or $WO_3$ respectively, since the chemical structure of the catalytically active, oxygen-containing compounds of molybdenum and/or tungsten is not yet exactly known but can only be postulated, eg, from the data of the IR spectra of the catalysts which can be used in the process of the invention.

In all cases, the catalysts according to the invention can be doped, in addition to containing the catalytically active, oxygen-containing molybdenum and/or tungsten compounds, with from 0.05 to 10 wt %, preferably with from 0.1 to 5 wt %, and more preferably with from 0.25 to 3 wt % of oxygen-containing compounds containing sulfur and/or phosphorus, in each case calculated on the total weight of the catalyst. Since it is likewise not known in what chemical form these compounds containing sulfur or phosphorus are present in the finished catalyst, the contents of these groups in the catalyst are in all cases calculated as $SO_4$ or $PO_4$ respectively.

When effecting the preparation of the catalysts according to the invention it is usual to start from the hydroxides of the respective support components. If these hydroxides are commercially available, such commercially available hydroxides can be used as starting materials for the preparation of the oxidic support, but preferably freshly precipitated hydroxides are used for the preparation of the oxidic support, which are dried after precipitation generally at a temperature of from 200° to 350° C., preferably at a temperature of from 50° to 150° C., particularly from 100° to 120° C., under atmospheric pressure or reduced pressure.

The water-soluble or hydrolyzable salts of the elements constituting the support material in general serve as starting compounds for the preparation of these hydroxides, for example, their halides, preferably their nitrates or carboxylates, and particularly their acetates. Suitable starting compounds for the precipitation of these hydroxides are, eg, zirconyl chloride, zirconyl nitrate, titanyl chloride, titanyl nitrate, yttrium nitrate, yttrium acetate, aluminum nitrate, aluminum acetate, iron(III) nitrate, tin(IV) halides, particularly tin(iV) chloride, zinc nitrate, or zinc acetate. From the solutions of these salts the corresponding hydroxides are precipitated preferably by means of aqueous ammonia solution. Alternatively the hydroxides can be obtained by the addition of dilute or weak acids, such as acetic acid, to water-soluble hydroxide complexes of the respective metals until precipitation of the respective hydroxide occurs. Likewise it is possible to obtain the hydroxides by the hydrolysis of organmetallic compounds, for example, the alcoholates of the respective metals, such as zirconium tetraethanolate, zirconium tetraisopropylate, titanium tetramethanolate, titanium tetraisopropylate, etc.

A gel-like precipitate generally forms during precipitation of these hydroxides, which after drying yields a X-ray amorphous powder. Possibly, these X-ray amorphous precipitates may comprise, in addition to the hydroxides of the respective metals, a large lumber of other hydroxyl group-containing compounds, for example, oxide hydrates, or polymeric, water-insoluble hydroxide complexes, etc. Since the exact chemical composition of these precipitates cannot be determined however, it is assumed for the purposes of this application, and for the sake of simplicity, that the compounds concerned are the hydroxides of the said metals. The term "hydroxide" used in this application thus represents a collective term for the hydroxy group-containing precipitates obtained by the aforementioned method of precipitation.

When using silicon dioxide as oxidic support material preferably freshly precipitated silicic acid is employed as starting material for the preparation of the catalysts which can be used in the process of the invention, which can be obtained, for example, by acidification of a waterglass solution, and which is advantageously dried prior to further processing, as described above for the hydroxide precipitates.

To the resulting hydroxides of the support components or the silicic acid, which in this application are also termed "support material precursors", the precursor compounds of the catalytically active, oxygen-containing molybdenum and/or tungsten compounds are applied preferably by impregnation with an aqueous solution of these precursor compounds. Examples of the water-soluble precursor compounds of the catalytically active, oxygen-containing tungsten or molybdenum compounds are, for example, the water-soluble salts of tungstic acid ($H_2WO_4$), such as are formed, for example, by dissolving tungsten trioxide in aqueous ammonia, ie the monotungstates, and the isopolytungstates formed therefrom by acidification, eg, the paratungstates or meta-tungstates, the water-soluble salts of molybdic acid ($H_2MoO_4$), such as are formed, for example, by dissolving molybdenum trioxide in aqueous ammonia and the isopolymolybdates forming therefrom by acidification, particularly the meta-molybdates and para-molybdates. Preferably, the ammonium salts of these tungstic and molybdic acids are applied by impregnation, as precursor compounds, to the hydroxides of said components or said silicic acid respectively. For information on the nomenclature, composition, and preparation of the molybdates, isopolymolybdates, tungstates, or isopolytungstates reference is made to Roempps Chemie-Lexikon, 8th Edition, Vol. 4, pp 2659–2660, Francksche Verlagsbuchhandlung, Stuttgart, 1985; Roempps Chemie-Lexikon, 8th Edition, Vol. 6, pp 4641–4644, Stuttgart 1988 und Comprehensive Inorganic Chemistry, 1st Edition, Vol. 3, pp 738–741 and 766–768, Perganon Press, New York 1973. Instead of the above molybdenum or tungsten precursor compounds of the catalytically active molybdenum or tungsten compounds it is possible to use hetero polyacids of molybdenum or tungsten, such as 12-tungstatosilicic acid ($H_4[Si\{W_{12}O_{40}\}.26H_2O$) or 12-molybdatosilicic acid, or their water-soluble salts, preferably their ammonium salts, to effect application of the molybdenum or tungsten to the hydroxidic, ie hydroxyl group-containing, support material precursor. The thus impregnated hydroxides of the components used in each case or the impregnated silicic acid are in general dried at temperatures ranging from 80° to 350° C., preferably of from 90° to 150° C. under atmospheric pressure or reduced pressure.

There is also the possibility of incorporating the above precursor compounds of the catalytically active, oxygen-containing molybdenum or tungsten compounds in the subsequent catalyst by intimately mixing them with one or more of the said hydroxides. Calcination of the support material precursor thus treated, to form the catalysts which can be used in the process of the invention, takes place in the same manner as described with reference to the support material precursors impregnated with these precursor compounds. However, the method of impregnation is preferably used for the preparation of the catalysts which can be used in the process of the invention.

The catalyst precursors thus impregnated and dried are converted to the finished catalysts by calcination in air at temperatures ranging from 500° to 1000° C., preferably from 550° to 900° C. and more preferably at temperatures ranging from 600° to 800° C. In the course of calcination the silicic acid or the hydroxides of the support components is/are converted to the oxidic support material, and the precursor compounds of the catalytically active, oxygen-containing molybdenum or tungsten compounds applied to said support material by impregnation are converted to these catalytically active components. Calcination at this high temperature is important if the THF polymerization is to achieve a high yield and thus a high space-time yield. At lower calcination temperatures the catalysts also cause THF polymerization to place but only with economically low conversions. On account of IR analyses on catalysts produced in this manner Yinyan et al, Rare Metals 11, 185 (1992) suppose that, in the case of tungsten-doped supported zirconium oxide catalysts, the precursor compound of the catalytically active, oxygen-containing tungsten compound, applied by impregnation to the zirconium hydroxide, becomes chemically combined, at the high calcining temperatures used, with the hydroxy groups of the support material precursor, the catalytically active, oxygen-containing tungsten compound being formed, which as regards their chemical structure and chemical activity, particularly their catacytical properties, are distinctly different from the oxygen-containing tungsten compounds when merely adsorbed to the support material zirconium dioxide. These facts are also assumed as regards the molybdenum-containing supported catalysts which can be used in the process of the invention.

As already mentioned, supported catalysts can be used in the process of the invention to advantage when they are doped with compounds containing sulfur and/or phosphorus in addition to compounds containing molybdenum and/or tungsten. The preparation of these catalysts takes place in a similar manner as that described above for the catalysts containing molybdenum and/or tungsten compounds only, compounds containing sulfur and/or phosphorus being additionally applied by impregnation to the hydroxides of said components or the silicic acid produced in a similar way. The application of the sulfur and/or phosphorus compounds to the support material can take place concurrently with the application of the molybdenum and/or tungsten component or afterwards. Advantageously, the sulfur and/or phosphorus components are prepared by impregnation of the hydroxides of said components or the silicic acid with an aqueous solution of a compound containing sulfate or phosphate groups, for example, sulfuric acid or phosphoric acid. Advantageously, solutions of water-soluble sulfates or phosphates can also be used for said impregnation, ammonium sulfates or ammonium phosphates being particularly preferred. A further method of applying the phosphorus-containing precursor compounds together with the precursor compounds containing molybdenum or tungsten to the hydroxidic support material precursor, consists in impregnating the hydroxidic support material precursor with phosphorus-containing hetero polyacids by the process described above. Examples of such hetero polyacids are 12-tungstatophosphoric acid ($H_3$-$P\{W_{12}O_4O\}.xH_2O$) and 12-molybdatophosphoric acid ($H$-$[P\{Mo_2O\}O_6].28H_2O$).

There can also be employed for this purpose hetero polyacids of molybdenum or tungsten with organic acids of phosphorus, for example, phosphonic acids. The said hetero polyacids can also be used in the form of their salts, preferably as ammonium salts, for this purpose.

During calcination under the aforementioned conditions the hetero polyacids dissociate to form the catalytically active, oxygen-containing molybdenum or tungsten compounds.

Some of the catalysts which can be used in the process of the invention are known and their preparation is described in JP-A 288,339/1989, JP-A 293,375/1993, J. Chem. Soc. Chem. Commun. 1259 (1988) und Rare Metals 11,185 (1992). The catalysts have been used hitherto only in petrochemical processes, for example, as catalysts for alkylations, isomerizations, and the cracking of hydrocarbons, ie processes which are not related to the process of the invention.

The catalysts which can be used in the process of the invention can be employed therein in the form of powders, for example, when carrying out the process by a suspension technique, or advantageously as shaped articles, eg, in the form of cylinders, balls, rings, coils, or gravel, particularly with the catalyst taking the form of a fixed bed, which is preferred when using, eg, loop reactors or when the process is operated continuously.

$C_1$–$C_{10}$ monocarboxylic acids, preferably $C_1$–$C_8$ monocarboxylic acids and particularly formic acid, acetic acid, propionic acid, 2-ethylhexanoic acid, acrylic acid, and methacrylic acid serve in general as telogens for the preparation of the PTHF monoesters of monocarboxylic acids.

Particularly surprising and particularly advantageous is the fact that when use is made of the telogens water and/or 1,4-butanediol PTHF can be obtained in the process according to the invention in high space-time yields in a single step. If desired, low molecular weight, open-chain PTHF having a molecular weight of from 200 to 700 dalton are recycled as telogen to the polymerization reaction, where it is converted to PTHF of higher molecular weight. Since 1,4-butanediol and low molecular weight PTHF have two hydroxy groups, they are not only incorporated as telogen at the chain ends of the PTHF chain, but are also inserted into the PTHF chain as monomer.

The telogen is advantageously added to the polymerization in the form of a solution in THF. Since the telogen causes termination of the polymerization, the average molecular weight of the PTHF or PTHF diester can be controlled via the amount of telogen used. The more telogen present in the reaction mixture, the lower the average molecular weight of the PTHF or the PTHF derivative. Depending on the telogen content of the polymerization mixture PTHF or the respective PTHF derivatives can be prepared having average molecular weights of from 250 to 10000 dalton. Preferably the process of the invention produces PTHF or the respective PTHF derivatives having average molecular weights of from 500 to 10000 dalton, more preferably from 650 to 3000 dalton. To this end the telogen is, based on the THF amount employed added in amounts of from 0.04 to 17 mol %, preferably from 0.2 to 8 mol % and more preferably from 0.4 to 4 mol %.

The polymerization is generally carried out at temperatures ranging from 0° to 80° C., preferably at 25° C. up to the boiling temperature of THF. The pressure used is usually not critical for the outcome of the polymerization, for which reason the process is generally carried out at atmospheric pressure or under the autogenous pressure of the polymerization system.

To avoid the formation of ether peroxides the polymerization is advantageous carried out under an atmosphere of inert gas. Suitable inert gases are nitrogen, hydrogen, carbon dioxide, or the noble gases, whilst nitrogen is preferably used.

The process according to the invention can be carried out batch-wise or continuously, the continuous mode of operation usually being preferred for economical reasons.

When the process is carried out batchwise the reactants THF, the respective telogen, and the catalyst are generally caused to react in a stirred vessel or loop reactor at the temperatures stated until the desired yield of THF is achieved. The reaction time can, depending on the amount of catalyst added, be from 0.5 to 40 h and is preferably from 1 to 30 h. The catalysts are preferably added, to effect polymerization, in general in amounts of from 1 to 90 wt % and preferably from 4 to 70 wt % and more preferably from 8 to 60 wt %, based on the weight of the THF employed.

For purification of the effluent coming from a batch process, said effluent is separated from the catalyst suspended therein, advantageously by filtration, decantation, or centrifugation.

The polymerization effluent free from catalyst is generally further purified by distillation, unconverted THF being advantageously removed, by distillation, in a first stage. In a second purification stage, if desired, low molecular weight PTHF can be separated from the polymer by distillation under reduced pressure and then recycled to the reaction. Alternatively, volatile THF oligomers can be depolymerized, for example by the process described in DE-A 3,042,960, and recycled to the reaction in this form.

EXAMPLES

Preparation of the catalysts

Catalyst A was prepared by the addition of 2600 g of zirconium hydroxide to a solution of 640 g of tungstic acid ($H_2wO_4$) in 3470 g of 25% strength ammonia solution. This mixture was kneaded for 30 min and thereafter dried for 2 h at a temperature of 120° C. The powder resulting after a sifting operation was pelletted, the resulting pellets (3×3 mm) then calcined at a temperature of 450° C. over a period of 2 h. The catalyst had a tungsten content, calculated as tungsten trioxide, of 20 wt % based on the total weight of the catalyst.

Catalysts B und C

Catalysts B und C were prepared analogously to catalyst A, but calcined at a temperature of 600° C. (cat. B) and 700° C. (cat. C) respectively.

Catalyst D

Catalyst D was prepared by the addition of 1600 g of zirconium hydroxide to a solution of 425 g of tungstic acid and 200 g of ammonium sulfate in 3470 g of 25% strength ammonia solution. This mixture was kneaded for 30 min and thereafter dried for 2 h at a temperature of 120° C. The powder resulting after a sifting operation was pelletted and the resulting pellets then calcined at a temperature of 600° C. over a period of 2 h. The catalyst had a tungsten content, calculated as tungsten trioxide, of 18 wt % and a sulfur content, calculated as $SO_4$, of 7 wt %, based on the total weight of the catalyst.

Catalyst E

Catalyst E was prepared by the addition of 2600 g of zirconium hydroxide to 2260 g of a 26.5 wt %, strength $MoO_3$ solution in 12% strength aqueous ammonia. This mixture was kneaded for 30 min and then dried for 16 h at a temperature of 120° c. The dried material was kneaded with 40 g of 75% strength phosphoric acid and 1.4 L of water over a period of 30 min, after which it was dried for 2 h at a temperature of 120° c. The powder resulting after a sifting operation was pelletted and the resulting pellets then calcined at a temperature of 600° C. over a period of 2 h. The catalyst had a molybdenum content, calculated as molybdenum trioxide, of 20 wt % and a phosphorus content, calculated as $PO_4$, of 1 wt %, based on the total weight of the catalyst.

Catalyst F

Catalyst F was prepared analogously to Catalysts A, but was calcined at 675° C.

Catalyst G

Catalyst G was prepared by adding 75 g of $TiO_2$ (P25, Messrs. Degussa) to a solution of 20 g of tungstic acid ($H_2WO_4$) in 100 g of a 32% strength aqueous $NH_3$ solution. This mixture was kneaded for 2 hours and then dried for 12 hours at 120° C. The powder obtained on trituration was calcined at 620° C. for 2 hours. The pulverulent catalyst had a tungsten content, calculated as $WO_3$, of 20 wt %, based on the total weight of the catalyst.

Catalyst H 16.58 kg of $TiOCl_2$ dissolved in 43.5 liters of distilled water was combined with 45 kg of a 10 wt% strength aqueous $NH_3$ solution by adding both solutions at 50° C. and while stirring at a constant pH of 6.5 to 30 liters of distilled water over a period of 1 hour. The mixture was stirred for a further hour. The resulting precipitate was then filtered, washed and dried for 24 hours at 120° C. 2.4 kg of this precipitated $TiO_2$ was added to a solution of 638 g of tungstic acid in 3.65 kg of 25% strength aqueous $NH_3$ solution. The mixture was kneaded and then shaped into 1.5 mm pellets. The pellets were first calcined for 2 hours at 450° C. and then for 2 hours at 610° C. The catalyst had a tungsten content, calculated as $WO_3$, of 18.6 wt %, based on the total weight of the catalyst.

Batch THF polymerizations

In a glass flask having a capacity of 100 mL and equipped with a reflux condenser 10 g of catalyst pellets (3×3 mm), which had been dried prior to use over a period of 18 h at a temperature of 180° C./0.3 mbar, For the removal of adsorbed water, were suspended under a blanket of nitrogen in 20 g of telogen-containing THF and left at a temperature of 50° C. for 24 h. After this time the reaction mixture was diluted with a further 20 g of THF. The catalyst pellets were removed by filtration and washed three times with 20 g of THF each time. The filtrates were combined, concentrated at 70° C./20 mbar in a rotation evaporator, and weighed. To determine the average molecular weight $\overline{M}_n$ a portion of the PTHF obtained was subjected to bulb tube distillation (150° C./0.1 mbar).

The average molecular weight $(\overline{M}_n)$ of the PTHF thus obtained was determined by gel permeation chromatography (GPC).

$\overline{M}_i$ is defined by the equation:

$$g \quad \overline{M}_n = \frac{\Sigma c_i}{\frac{\Sigma c_i}{\overline{M}_i}}$$

in which $c_i$ stands for the concentration of the individual polymer species i in the polymer mixture obtained and in which $\overline{M}_i$ stands for the molecular weight of the individual polymer species i.

PTHF yields obtained batchwise using different catalysts and telogens and the average molecular weights $\overline{M}_n$ are listed in Table 1 below.

Table 2 lists the results of the batchwise polymerization of THF to PTHF over catalysts calcined at different temperatures under otherwise identical reaction conditions.

TABLE 1

Batch polymerization Of THF Using Different Catalysts And Telogens

| Example No. | Catalyst | Telogen | Amount[1] [wt %] | THF Conv.[2] [%] | Av. Mol. Wt. [$M_n$] |
|---|---|---|---|---|---|
| 1 | $WO_3/ZrO_2$ C | Butanediol | 2000 | 56.8 | 7200 |
| 2 | $MoO_3/ZrO_2/PO_4$ E | Butanediol | 2000 | 60.9 | 6900 |
| 3 | $WO_3/ZrO_2$ C | Water | 400 | 48.0 | 9700 |
| 4 | $WO_3/ZrO_2$ C | Water | 1000 | 12 | 2600 |
| 5 | $WO_3/ZrO_2$ C | Formic acid[3] | 1020 | 35.5 | 6600 |

[1] amount of telogen, based on THF
[2] conversion to PTHF or PTHF monoformate the selectivity of the reaction was in each case approximately 100%
[3] preparation of PTHF monoformate

TABLE 2

Batch polymerization of THF Using $Wo_3/ZrO_2$ catalysts Calcined at Different Temperatures

| Example | Catalyst | Calcining temp. [°C.] | Telogen | Amount[1] [ppm] | Conv. THF[2] [%] |
|---|---|---|---|---|---|
| 6 | A | 450 | 1,4-butane-diol | 2000 | 0.3 |
| 7 | B | 600 | | | 31.2 |
| 8 | C | 700 | | | 56.8 |

[1] amount of telogen, based on THF
[2] selectivity toward PTHF approximately 100%

Continuous THF polymerization

EXAMPLE 9

A fixed bed reactor having a capacity of 250 mL was filled under argon with 220 mL (372 g) of the $MoO_3/ZrO_2/PO_4^{3-}$-catalyst E which had been dried for 20 h at a temperature of 180° C./0.3 mbar. When placed in the reactor the catalyst was covered with THF (<0.01 wt % of water). A circulating pump was provided to effect circulation of the reaction mixture. When the reactor, pump, and conduits had all been completely filled with THF the reaction mixture was pumped over the catalyst for 24 h at a reactor temperature of 50° C., without THF feed. 8.1 g of THF per hour containing 0.2 wt % of 1,4-butanediol were then continuously metered into the circuit over a period of 120 h. The circulation/feed ratio was approximately 60:1. The average THF yield over the reaction time of 120 h was 48.9%. The average molecular weight $\overline{M}_n$ of the PTHF obtained was 2400 dalton as determined by GPC.

EXAMPLE 10

The continuous THF polymerization described in example 9 over catalyst E was continued with the same rate of feed of THF, which contained 0.4 wt % of 1,4-butanediol, but without feed-back of the product (circulating pump switched off), using otherwise identical reaction conditions. Once the PTHF yield had reached a steady value, the effluent formed was collected over a period of 72 h. Following concentration of the reaction solution, as described for the above batch tests, PTHF was obtained having an average molecular weight of 900 dalton (as determined by GPC) in a THF yield of 6.8%.

Batch polymerisation of THF

The batch polymerisation experiments with Catalysts F to H were carried out as described in Examples 1 or 2. Table 3 shows the results obtained.

TABLE 3

| Example No. | Catalyst | Telogen | Amount [wt %] | THF Conv. [%] | Av. Mol. Wt. [$M_n$] |
|---|---|---|---|---|---|
| 11 | $WO_3/ZrO_2$ F | Butanediol | 2000 | 36.2 | 5500 |
| 12 | $WO_3/TiO_2$ G | Butanediol | 2000 | 47.9 | 7900 |
| 13 | $WO_3/TiO_2$ H | Butanediol | 2000 | 37.2 | 5300 |

Continuous THF polymerisation in the presence of butane-1,4-diol

EXAMPLE 14

Under an argon blanket, a 250 ml fixed-bed reactor was filled with 332 g (250 ml) of the $WO_3/ZrO_2$ catalyst F dried for 72 hours at 180° C./0.3 mbar. The polymerisation equipment was filled with THF containing butane-1,4-diol (0.5 wt %). The reaction mixture was initially pumped for 24 hours and at a reactor temperature of 50° C. over the catalyst. Subsequently, THF containing butane-1,4-diol (0.5 wt %) was continuously added at a space velocity of 0.166 kg of THF/liter of catalysts*h. The polymerisation product over a period of 72 hours (3.00 kg) was worked up by distilling off the unreacted THF under reduced pressure, followed by short-path distillation at 150° C./0.3 mbar. 290 g of PTHF was obtained which had, according to the $^1$H-NMR spectrum, a mean molecular weight $M_n$ of 2100 dalton. The yield was 9.7%. The space-time yield was 16 g of PTHf 2100/liter of catalyst*h.

We claim:

1. A process for the preparation of polytetrahydrofuran or polytetrahydrofuran monoesters of $C_1$–$C_{10}$ monocarboxylic acids by the polymerization of tetrahydrofuran over a heterogeneous catalyst in the presence of one of the telogens water, 1,4-butanediol or polytetrahydrofuran having a molecular weight of from 200 to 700 dalton or a mixture of said telogens, wherein the catalyst used is a supported catalyst which contains a catalytically active amount of an oxygen-containing tungsten or molybdenum compound or a mixture of these compounds on an oxidic support material and which has been calcined at temperatures ranging from 550° to 800° C.

2. A process as defined in claim 1, wherein zirconium dioxide, titanium dioxide, hafnium oxide, yttrium oxide, iron oxide, aluminum oxide, tin oxide, silicon dioxide, zinc oxide or a mixture of these oxides is used as oxidic support material.

3. A process as defined in claim 1, wherein a catalyst is used which is additionally doped with oxygen-containing sulfur and/or phosphorus compounds.

4. A process as defined in claim 1, wherein the supported catalyst contains from 0.1 to 50 wt % of molybdenum and/or tungsten, calculated as molybdenum trioxide or tungsten trioxide and based on the total weight of the catalyst.

5. A process as defined in claim 1, wherein a supported catalyst is used which contains from 0.05 to 10 wt % of sulfur and/or phosphorus, calculated as sulfate or phosphate and based on the total weight of the catalyst.

6. A process as defined in claim 1, wherein zirconium dioxide is used as support material.

7. A process as claimed in claim 1, wherein titanium dioxide or mixtures of titanium dioxide with zirconium dioxide are used as support material.

8. A process as defined in claim 1, wherein water or 1,4-butanediol or a 1,4-butanediol/water mixture is used as telogen.

9. A process as defined in claim 1, wherein tetrahydrofuran having a telogen content of from 0.04 to 17 mol %, based on tetrahydrofuran, is used for the polymerisation.

10. A process as defined in claim 1, wherein a supported catalysts is used which has been prepared by impregnation of the freshly precipitated and dried hydroxides of zirconium, titanium, hafnium, yttrium, iron, aluminum, tin, or zinc or freshly precipitated and dried silicic acid or a mixture of these compounds with a solution of the precursor compounds of the catalytically active molybdenum and/or tungsten compounds and optionally with sulfate-containing and/or phosphate-containing solutions, followed by drying and calcination at a temperature of from 550° to 800° C.

\* \* \* \* \*